United States Patent [19]

Kaneko et al.

[11] Patent Number: 4,626,957
[45] Date of Patent: Dec. 2, 1986

[54] CAPACITOR WITH DISCHARGE GAP

[75] Inventors: Toshimi Kaneko, Sabae; Kazumi Kido, Fukui, both of Japan

[73] Assignee: Murata Manufacturing Co., Ltd., Japan

[21] Appl. No.: 701,412

[22] Filed: Feb. 14, 1985

[30] Foreign Application Priority Data

Feb. 22, 1984 [JP] Japan .......................... 59-25084[U]

[51] Int. Cl.$^4$ ............................................. H01G 1/11
[52] U.S. Cl. ..................................................... 361/275
[58] Field of Search .............. 361/306, 307, 308, 320, 361/321, 321 C, 433 C, 433 S, 305, 275

[56] References Cited

U.S. PATENT DOCUMENTS

| | | | |
|---|---|---|---|
| 2,830,698 | 4/1958 | Coda et al. | 361/321 X |
| 3,056,939 | 10/1962 | Rayburn | 361/306 X |
| 3,087,093 | 4/1963 | Bourgerie | 361/15 |
| 3,316,467 | 4/1967 | Sperry | 361/275 |
| 3,585,472 | 6/1971 | Dornfeld et al. | 361/321 C X |
| 3,654,511 | 4/1972 | Iwaya | 361/15 X |
| 4,115,833 | 9/1978 | Cirkel | 361/307 X |
| 4,124,876 | 11/1978 | Labadie et al. | 361/307 X |
| 4,443,830 | 4/1984 | Kaneko et al. | 361/275 |

*Primary Examiner*—Donald A. Griffin
*Attorney, Agent, or Firm*—Ostrolenk, Faber, Gerb & Soffen

[57] ABSTRACT

A capacitor having a discharge gap, which comprises a generally plate-like substrate having a pair of opposite major surfaces and having a portion cut away to define an opening, first and second capacitive electrodes formed on the respective major surfaces of the substrate, and first and second discharge electrodes electrically connected with the first and second capacitive electrodes, respectively. The first and second discharge electrodes are positioned on respective sides of the opening in the substrate so as to confront each other across a discharge gap which includes the width and the thickness of the opening.

2 Claims, 9 Drawing Figures

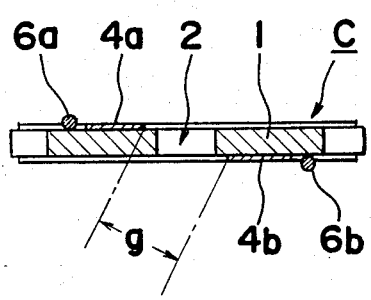
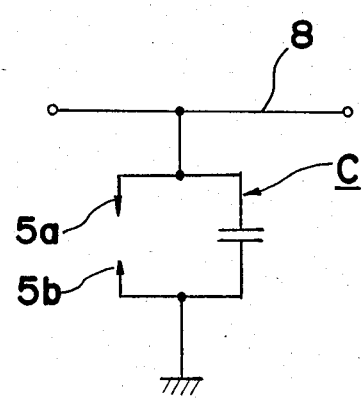
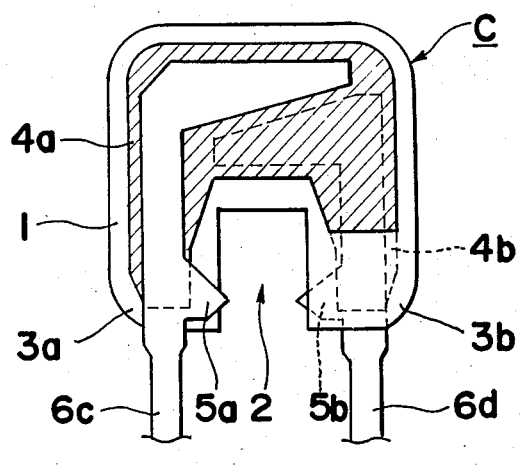
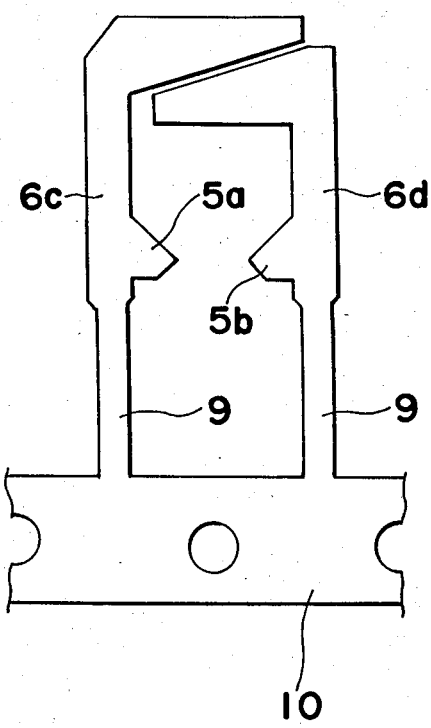
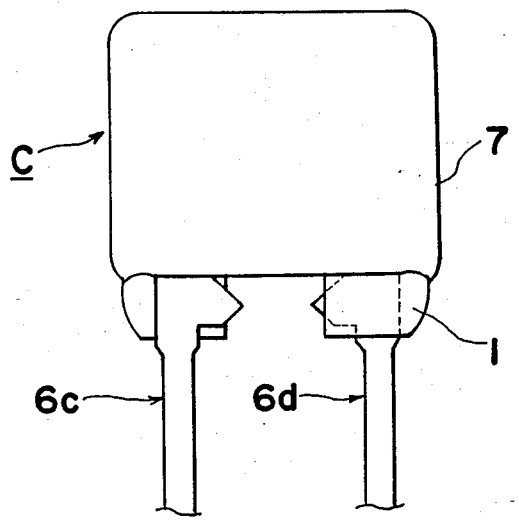

CAPACITOR WITH DISCHARGE GAP

BACKGROUND OF THE INVENTION

The present invention relates to a capacitor having a discharge gap suited for use in a circuit between an antenna and a tuner of, for example, a television set for protecting an antenna input circuit and/or other circuit component parts from the high voltage input brought about by, for example, lightning striking the antenna.

In general, the signal received by a television antenna is transmitted to a television set through a signal transmission line such as, for example, a coaxial cable. In the event that the television antenna is struck by lightning, the high voltage surge of lightning is apt to be impressed on an antenna input circuit with some or all of the circuit component parts being consequently damaged. In order to avoid this, it is known to use in the antenna input circuit a capacitor having a discharge gap defined by a pair of opposed discharge electrodes for causing the discharge of the abnormal high voltage.

One example of the conventional capacitors used for this purpose is illustrated in FIGS. 1 and 2 of the accompanying drawings.

As shown in FIG. 1, the conventional capacitor, generally identified by C, comprises a dielectric substrate 1 having a pair of opposite major surfaces formed with first and second electrode layers 4a and 4b and a common electrode layer 11, respectively, the common electrode layer 11 on one of the opposite major surfaces being so positioned and so sized as to have a pair of opposite portions thereof aligned with the first and second electrode layers 4a and 4b on the other of the opposite major surfaces whereby the capacitor C can represent an electric equivalent circuit wherein, as shown in FIG. 2, two capacitance elements C1 and C2 are connected in series with each other. At respective portions of the first and second electrode layers 4a and 4b generally opposite to those portions thereof which are aligned with the common electrode layer 11, the first and second electrode layers 4a and 4b have respective electrode extensions extending outwardly therefrom and shaped so as to confront each other, leaving a gap g therebetween, which electrode extensions serve as discharge electrodes 5a and 5b.

The conventional capacitor C shown in FIG. 1 is so designed that, when a high voltage is applied between the terminals of the capacitor C, a spark discharge can take place in the gap g between the discharge electrodes 5a and 5b, forming respective parts of the first and second electrode layers 4a and 4b, to protect the other circuit component parts against such high voltage.

In the illustrated conventional capacitor of the construction described above, not only because the capacitance as a whole is derived from the series-connected capacitance elements C1 and C2 as shown in FIG. 2, but also because the first and second electrode layers 4a and 4b forming the respective capacitance elements C1 and C2 together with the common electrode layer 11 have the respective discharge electrodes 5a and 5b formed integrally therewith, the surface area of each of those portions of the first and second electrode layers 4a and 4b which are aligned with the common electrode layer 11 on one side of the substrate 1 opposite to the electrode layers 4a and 4b is necessarily limited. Therefore, unless a dielectric substrate 1 of increased size is used to increase the surface area of each of those portions of the first and second electrode layers 4a and 4b, the capacitance available for a given size is limited.

In addition to the above described disadvantage, there is another disadvantage inherent in the conventional capacitor. Namely, since the first and second electrode layers 4a and 4b are formed on the same major surface of the substrate 1 by the use of, for example, a circuit printing technique, a surface discharge is liable to occur over the major surface of the substrate 1 even at a relatively low voltage and, therefore, the voltage at which discharge is initiated cannot be increased to a high value except with difficulty.

SUMMARY OF THE INVENTION

The present invention has been developed with a view to substantially eliminating the above described disadvantages and inconveniences inherent in the prior art capacitor and has for its essential object to provide an improved capacitor with a discharge gap, which is reliable in operation to discharge a high voltage, with no occurrence of surface discharge thereof, for protecting circuit component parts against the high voltage.

Another object of the present invention is to provide an improved capacitor of the type referred to above, which is advantageously minimized in size and yet exhibits a high static capacitance.

A further object of the present invention is to provide an improved capacitor of the type referred to above, which is effective to exhibit an excellent filtering characteristic for filtering high frequency noise under normal operating conditions.

In order to accomplish these objects of the present invention, an improved capacitor herein disclosed comprises a generally plate-like substrate having a pair of opposite major surfaces and having a portion thereof cut away to define an opening, first and second capacitive electrodes formed on the respective major surfaces of the substrate, and first and second discharge electrodes formed on the respective major surfaces of the substrate and electrically connected respectively with the first and second capacitive electrodes. Not only are the first and second discharge electrodes spaced from each other by the intervention of the substrate therebetween, but also they are so positioned on respective sides of the opening in the substrate as to confront each other in the direction across the opening. Accordingly, it is clear that the discharge gap between the first and second discharge electrodes on the respective major surfaces of the substrate includes the space defined by the opening in the substrate.

Because of the presence of the opening in the discharge gap, that is, between the discharge electrodes, there is no possibility of occurrence of the surface discharge such as in the above mentioned prior art capacitor having a discharge gap, and therefore, voltage at which the discharge is initiated can be increased to a high value to sufficiently protect the other circuit component parts against the breakdown voltage such as brought about by lightning.

According to one embodiment of the present invention, the first and second discharge electrodes are preferably formed integrally with, and hence, form integral parts of the first and second capacitive electrodes, respectively. However, in another preferred embodiment of the present invention, the first and second discharge electrodes are constituted by respective portions of generally strip-shaped, separate terminal members each having one end portion rigidly connected with the associated capacitive electrode and the other end portion adapted for connection with an external circuit.

BRIEF DESCRIPTION OF THE DRAWINGS

These and other objects and features of the present invention will become apparent from the following description taken in conjunction with preferred embodiments thereof with reference to the accompanying drawings, in which:

FIG. 5 is a cross-sectional view taken along the line V—V in FIG. 3;

FIG. 6 is a diagram showing an electric equivalent circuit of the capacitor embodying the present invention;

FIGS. 7 and 8 are views similar to FIGS. 3 and 4, showing the capacitor according to another preferred embodiment of the present invention, respectively; and FIG. 9 is a fragmentary top plan view of a lead frame used to make terminal members for the capacitor shown in FIGS. 7 and 8.

DETAILED DESCRIPTION OF THE EMBODIMENTS

Figure 1:
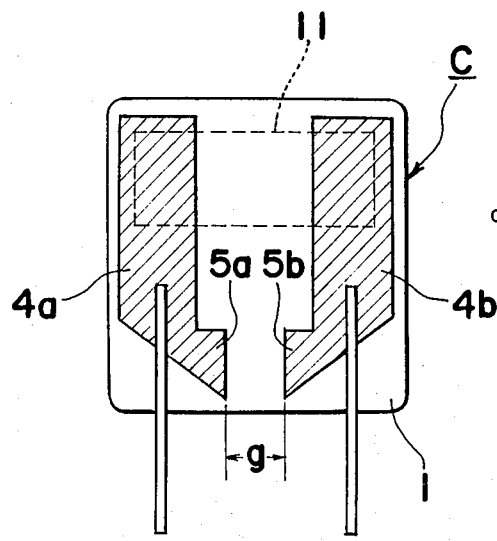
FIG. 1 is a longitudinal sectional view of the prior art capacitor with discharge gap.
Figure 2:
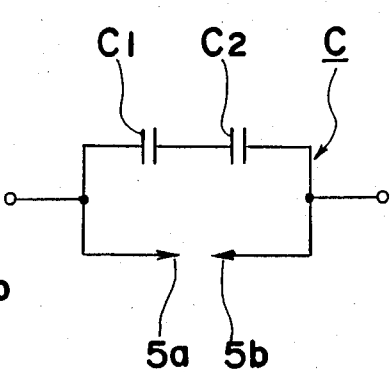
FIG. 2 is a diagram showing an electric equivalent circuit of the prior art capacitor shown in FIG. 1.

Before the description of the present invention proceeds, it is to be noted that like parts are designated by like reference numerals throughout the accompanying drawings.

Referring first to FIGS. 3 to 6, a capacitor with discharge gap according to a first preferred embodiment of the present invention, generally identified by C, comprises a plate-like dielectric substrate 1 made of, for example, ceramics and having a pair of opposite major surfaces. So far shown, the substrate 1, generally square in shape, has its four corners chamfered arcuately and has an opening 2 defined therein so as to extend a certain distance inwardly of the substrate from one side edge thereof, thereby leaving a pair of spaced leg areas 3a and 3b which are integral parts of the substrate located on respective sides of the opening 2. First and second capacitive electrodes 4a and 4b are formed on the respective opposite major surfaces of the substrate 1 by the use of any known electrode material and by the use of any known circuit printing technique and have their respective portions extended to the associated leg areas 3a and 3b to provide first and second discharge electrodes 5a and 5b. Thus, it will be readily seen that the first and second discharge electrodes 5a and 5b overlaying the major surfaces of the substrate 1 at the leg areas 3a and 3b, respectively, confront with each other with the opening 2 present therebetween, in which opening 2 a spark discharge occurs between the first and second discharge electrodes 5a and 5b.

Figure 3:
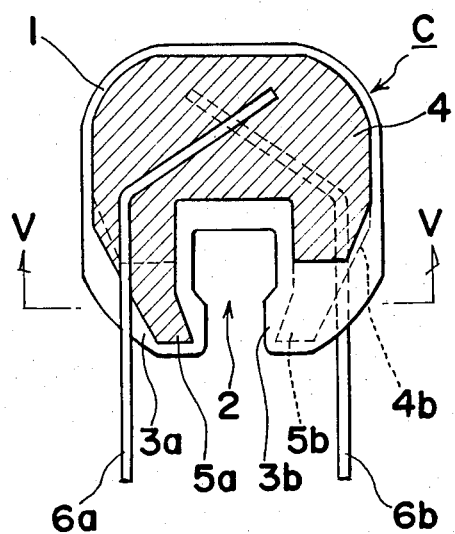
FIG. 3 is a front elevational view of a capacitor with discharge gap according to a first preferred embodiment of the present invention, with a protective outer sheath removed.
Figure 4:
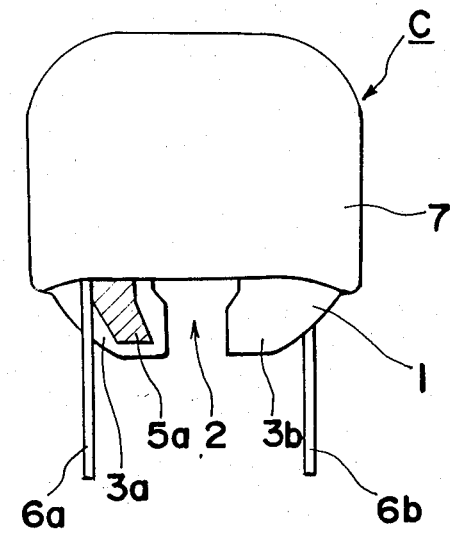
FIG. 4 is a front elevational view of the capacitor covered by the outer sheath.

The capacitor C shown in FIGS. 3 to 5 also comprises a pair of spaced leads 6a and 6b each having one end portion soldered to the associated capacitive electrode 4a and 4b and the other end portion situated exteriorly of the capacitor C for electrical connection with an external electric circuit, for example, an antenna input circuit. The assembly is dip-coated to provide a protective outer sheath 7 covering the assembly except for the leg areas 3a and 3b of the substrate 1 so that the first and second discharge electrodes 5a and 5b can be exposed to the outside as best shown in FIG. 4.

From the foregoing, it has now become clear that the capacitive electrodes 4a and 4b are substantially completely aligned with each other with the substrate 1 positioned therebetween while the discharge electrodes 5a and 5b are offset with each other with respect to the opening 2 in the substrate 1. Accordingly, the discharge gap g between the discharge electrodes 5a and 5b contains the opening 2 and the spark discharge occurs in the discharge gap g traversing the opening 2. More specifically, assuming that the capacitor C embodying the present invention is connected with a transmission line 8 which is in turn connected to an antenna (not shown) as shown in FIG. 6, a noise component contained in an input signal fed through the transmission line 8 from the antenna is removed by the capacitor C at normal operating condition. The input signal is, after the noise component has been removed, then fed to an input circuit (not shown). However, in the event that a high voltage surge, such as brought about by lightning, is inputed to the antenna and is then applied between the leads 6a and 6b of the capacitor C, the discharge takes place between the discharge electrodes 5a and 5b across the opening 2. Since the discharge electrodes 5a and 5b are offset with each other relative to the opening 2, that is, they are positioned on the respective opposite surfaces of the substrate and on respective sides of the opening 2, the spark traverses the discharge gap g obliquely across the opening 2, thereby to make the capacitor C protect the circuit component parts against the high voltage surge.

In the foregoing embodiment, the discharge electrodes 5a and 5b have been shown and described as forming the integral parts of the capacitive electrodes 4a and 4b, respectively. However, they may be constituted by respective members separate from the capacitive electrodes 4a and 4b as will now be described with reference to FIGS. 7 to 9.

In the embodiment shown in FIGS. 7 and 8, instead of the employment of the leads 6a and 6b shown as employed in the form of a wire in the foregoing embodiment, generally F-shaped leads 6c and 6d each in the form of a generally flattened metal strip are employed. As shown, each of the discharge electrodes 5a and 5b is constituted by a portion of the respective lead 6c or 6d which corresponds to an intermediate horizontal bar of the shape of the figure "F" and is, therefore, an integral part of the respective lead 6c or 6d.

The leads 6c or 6d having the discharge electrodes 5a and 5b formed integrally therewith are soldered to the respective capacitive electrodes 4a and 4b with the discharge electrodes 5a and 5b overlaying the respective leg areas 3a and 3b and positioned on respective sides of the opening 2. So far shown, the discharge electrodes 5a and 5b integral with the respective leads 6c and 6d are so shaped as to project into the opening 2 in a direction close towards each other, but this may not be always essential in the practice of the present invention and they may be set back from the opening 2 as is the case with the foregoing embodiment. Although the capacitive electrodes 4a and 4b are shown as formed on the opposite major surfaces of the substrate 1 so as to extend in the respective leg areas 3a and 3b, they may not extend in the respective leg areas 3a and 3b.

FIG. 9 illustrates a method by which a pair of the leads 6c and 6d for each capacitor C according to the second embodiment of the present invention shown in FIGS. 7 and 8 are prepared. So far shown, the pair of the leads 6c and 6d are prepared by punching or blanking a metal sheet, with the use of any known press, so as to obtain the leads 6c and 6d connected together by means of a lead frame 10 through connecting legs 9 as shown in FIG. 9 and then cutting the connecting legs 9 to make the leads 6c and 6d separate from the lead frame 10. In practice, the single lead frame 10 carries a number of the paired leads 9c and 9d for a corresponding number of the capacitors to be produced.

In the embodiment shown in and described with reference to FIGS. 7 and 8, since the discharge electrodes 5a and 5b are substantially in the form of a metal plate, it is effective to avoid any possible exhaustion or melting of the discharge electrodes which would result from the heat evolved by the spark discharge occurring in the discharge gap g between those discharge electrodes 5a and 5b. Therefore, the repeated occurrence of the spark discharge would not substantially reduce the voltage at which the spark discharge is initiated, with no discharge characteristic being adversely affected.

Although the present invention has fully been described in connection with the preferred embodiments thereof, it is to be noted that various changes and modifications are apparent to those skilled in the art. By way of example, the shape of the capacitor according to any one of the embodiments may not be limited to that shown and described, but may be rectangular or circular.

In addition, although in any one of the foregoing embodiments the capacitive electrodes have been shown as identical in shape and dimension, they may be different from each other where, for example, the difference in allowance for the static capacitance is desired to be reduced or where the surface area of the substrate occupied by one of the capacitive electrodes is desired to be different from that occupied by the other of the capacitive electrodes.

Moreover, the width of the opening in the substrate, and hence, the size of the discharge gap, may be of any arbitrarily chosen value.

Accordingly, such changes and modifications are to be construed as included within the true scope of the present invention as defined by the appended claims unless they depart therefrom.

What is claimed is:

1. A capacitor having a discharge gap, which comprises:

a generally plate-like substrate having a pair of opposite major surfaces and having a portion cut away to define an opening;

first and second capacitive electrodes formed on the respective major surfaces of the substrate; and first and second discharge electrodes electrically connected with the first and second capacitive electrodes, respectively, said first and second discharge electrodes being positioned on respective sides of the opening in the substrate so as to confront each other across a discharge gap including the opening, and further comprising a pair of leads each having one end portion rigidly connected to a respective capacitive electrode and another end portion adapted for external electric connection, said discharge electrodes being formed integrally with the respective leads at a substantially intermediate portion thereof.

2. A capacitor having a discharge gap, which comprises:

a generally plate-like substrate having a pair of opposite major surfaces and having a portion cut away to define an opening;

first and second capacitive electrodes formed on the respective major surfaces of the substrate; and first and second discharge electrodes electrically connected with the first and second capacitive electrodes, respectively, said first and second discharge electrodes being positioned on respective sides of the opening in the substrate so as to confront each other across a discharge gap which includes both the width of said opening and the thickness of said substrate.

* * * * *